US011222286B2

(12) United States Patent
Choe et al.

(10) Patent No.: US 11,222,286 B2
(45) Date of Patent: Jan. 11, 2022

(54) TARGET DOCUMENT TEMPLATE GENERATION

(71) Applicant: The Toronto-Dominion Bank, Toronto (CA)

(72) Inventors: Mok Choe, Potomac, MD (US); Thomas M. Kerigan, Toronto (CA); Salvatore Aspro, Vaughan (CA); Evgenia Syromyatnikova, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 164 days.

(21) Appl. No.: 16/442,335

(22) Filed: Jun. 14, 2019

(65) Prior Publication Data

US 2020/0394567 A1     Dec. 17, 2020

(51) Int. Cl.
| G06F 17/00 | (2019.01) |
| G06N 20/20 | (2019.01) |
| G06Q 10/10 | (2012.01) |
| G06F 16/93 | (2019.01) |
| G06F 40/186 | (2020.01) |

(52) U.S. Cl.
CPC ............ G06N 20/20 (2019.01); G06F 16/93 (2019.01); G06F 40/186 (2020.01); G06Q 10/10 (2013.01)

(58) Field of Classification Search
CPC ...... G06N 20/20; G06N 3/0454; G06N 5/003; G06F 40/186; G06F 16/93; G06F 40/279; G06F 40/56; G06Q 10/10

USPC ............................................ 715/200; 706/12
See application file for complete search history.

(56) References Cited

U.S. PATENT DOCUMENTS

| 10,614,106 B2* | 4/2020 | Kelsey ................ G06F 16/3329 |
| 10,726,374 B1* | 7/2020 | Engineer ................ G06N 20/00 |
| 2008/0163043 A1* | 7/2008 | van Eikeren ......... G06F 40/186 715/255 |
| 2017/0032035 A1* | 2/2017 | Gao ......................... G06N 3/08 |
| 2020/0133964 A1* | 4/2020 | Lee ........................ G06F 16/258 |
| 2020/0159820 A1* | 5/2020 | Rodriguez ............ G06F 40/253 |
| 2020/0293712 A1* | 9/2020 | Potts ...................... G16H 10/60 |
| 2020/0356592 A1* | 11/2020 | Yada ........................ G06F 40/20 |
| 2020/0364404 A1* | 11/2020 | Priestas ................... G06F 16/93 |
| 2020/0410157 A1* | 12/2020 | van de Kerkhof ..... G06F 40/30 |

* cited by examiner

*Primary Examiner* — Hassan Mrabi
(74) *Attorney, Agent, or Firm* — Patent Capital Group

(57) ABSTRACT

To automatically generate a project document, a server in a computing environment receives input documents associated with a project, and extracts a set of features from each input document. The server determines a frequency of the words in each input document and stores the frequencies in relation to the words in the sets of words. The server than applies a document type machine-learned model to a set of words for each input document to infer a document type. The document machine-learned model may be trained using a bag-of-words representation. The server then applies a architecture pattern machine-learned model the set of input documents to determine a target architecture pattern. The server automatically generates a project document for the project based on the document types and inferred architecture pattern.

21 Claims, 7 Drawing Sheets

TARGET DOCUMENT TEMPLATE GENERATION

BACKGROUND

This invention relates generally to document generation, and, more particularly, automatically generating project documents.

Members of organizations, such as business entities or universities, plan and execute projects within the organization. A project may include plans for a set of tasks that are directed to fulfilling a particular purpose or goal. For example, a project for a financial institution may be directed to increasing the revenue or the number of customers by a threshold amount. Projects may be planned and executed across different members and teams of the organization. For example, the project for the financial institution may be planned and executed by different members of the customer service team as well as the marketing team.

Often times, it is critical to generate an integrated documentation of the project. For example, a project document may provide members of the project with the necessary context, expectation, and action items to complete the project. As another example, a project document may outline the lifecycle of the project, such that members of the project can keep track of the necessary progress throughout the lifecycle of the project. As yet another example, a project document may be used to communicate the purpose and goals of the project to both members inside the organization and outside the organization (e.g., stakeholders), and thus, may serve as an important tool for communication. Moreover, depending on, for example, which team in the organization that the project is associated with, the project document may be required to follow a particular architecture that specifies a certain structure and organization of the project document.

Typically, project documents are generated as a manual process that requires a large amount of time and effort by aggregating and integrating input documents from various sources. In particular, the input documents are a set of heterogeneous documents that may be composed of documents with different file types (e.g., Word document, PDF, etc.), documents from different members and teams, and the like that were created to document and perform various parts of the project. For example, a project may be associated with an e-mail from a project manager that includes details on the business strategy of a project, and also with a document that includes planning for various tasks of the project.

To generate a project document, a human operator typically retrieves and reviews the input documents, and manually integrates the retrieved information into the desired document architecture. The operator must also manually fill out portions of the document to reflect important information from the input documents and later review and update the project documents accordingly. However, the time required to generate the project document by hand may reduce the available time to work on the business process itself, or other just as important business processes.

SUMMARY

A project document generation system receives a set of input documents describing a project, and generates an integrated project document for the project based on predicted characteristics of the input documents and the project associated with the input documents. In some cases, the contents of the integrated project document may be sparse, but the project document may function as a starting template for the project, such that a human operator or other members of the project can easily fill in additional details in the project document without having to manually retrieve and aggregate information from different input documents. In this manner, the process of generating a project document can be significantly facilitated, which can result in significant savings in time and resources for the project.

In one embodiment, given a set of input documents, the project document generation system generates a project document based on predicted input document types and a predicted architecture pattern of the project document. The document type specifies a category of an input document based on the contents of the document. The architecture pattern for a set of input documents specifies the structure and organization of the resulting project document. The project document generation system may analyze different architectures patterns across project documents in the system, and identify a set of architecture patterns that are used within the organization.

In one embodiment, the project document generation system trains a machine-learned document type model configured to receive a set of features of an input document, and generate a predicted input document type. In one instance, the set of features are a bag-of-words of the input document that characterize the input document with respect to the words it contains and their corresponding frequencies in the document. The project document generation system also trains a machine-learned architecture pattern model configured to receive features for a set of input documents, and generate a predicted architecture pattern for a project document associated with the set of input documents.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Overview

Figure 1:
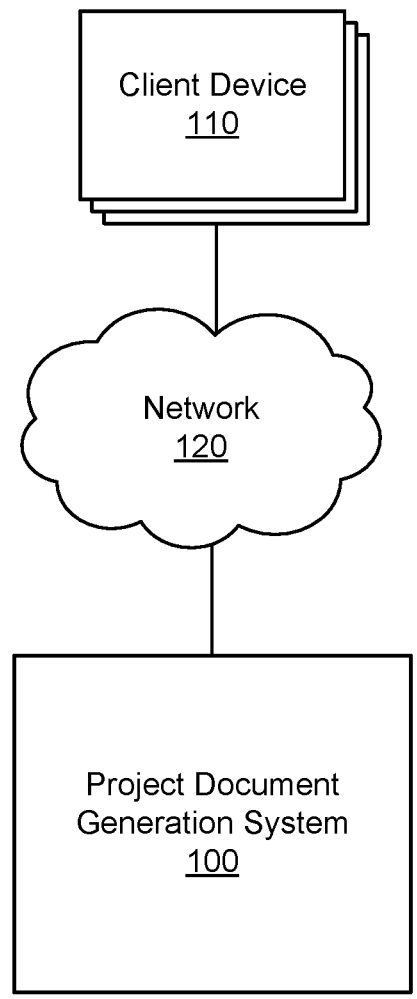
FIG. 1 illustrates a computing environment and architecture for project document generation, according to one embodiment.

FIG. 1 illustrates a computing environment and architecture for project document generation, according to one embodiment. The illustrated computing environment includes a project document generation system 100 and a client device 110, which are in communication via a network 120. The project document generation system 100 receives input information, such as input documents (or a designation thereof), from the client device 110, and, the project document generation system 100 returns project documents the client device 110. In alternative embodiments, other components may be included in the computing environment. In addition, these systems are shown in this configuration to aid in understanding of this disclosure, and the functions of various systems may also be combined. For example, the client device 110 may be a client device with built-in functionality for project document generation done by the project document generation system 100. In some embodiments, the components shown in FIG. 1 may be connected through a cloud computing service.

The project document generation system 100 automatically generates project documents given a set of input documents. Specifically, members of organizations, such as business entities, plan and execute projects within the organization. A project may include plans for a set of tasks that are directed to fulfilling a particular purpose or goal. For example, a project for a financial institution may be directed to increasing the revenue or the number of customers by a threshold amount. Projects may be planned and executed across different members and teams of the organization. For example, the project for the financial institution may be planned and executed by different members of the customer service team as well as the marketing team.

Often times, it is critical to generate an integrated documentation of a project for its execution. For example, a project document may provide members of the project with the necessary context, expectation, and action items to complete the project. As another example, a project document may outline the lifecycle of the project, such that members of the project can keep track of the necessary progress throughout the lifecycle of the project. As yet another example, a project document may be used to communicate the purpose and goals of the project to both members inside the organization and outside the organization (e.g., stakeholders), and thus, may serve as an important tool for communication. Moreover, depending on, for example, which team in the organization that the project is associated with, the project document may be required to follow a particular architecture that specifies a certain structure and organization of the project document.

Typically, project documents are generated as a manual process that requires a large amount of time and effort by aggregating and integrating input documents from various sources. In particular, the input documents are a set of heterogeneous documents that may be composed of documents with different file types (e.g., Word document, PDF, etc.), documents from different members and teams, and the like that were created to record and execute various parts of the project. For example, a project may be associated with an e-mail from a project manager including details on the business strategy of a project, and also a document planning for various tasks of the project.

To generate a project document, a human operator usually retrieves and reviews the input documents, and manually integrates the retrieved information into the desired document architecture. The operator must also manually fill out portions of the document to reflect important information from the input documents and later review and update the project documents accordingly. However, the time required to generate the project document by hand may reduce the available time to work on the business process itself, or other just as important business processes.

The project document generation system 100 receives a set of input documents describing a project from one or more client devices 110, and generates an integrated project document for the project based on predicted characteristics of the input documents and the project associated with the input documents. In some cases, the contents of the integrated project document may be sparse, but the project document may function as a starting template for the project, such that a human operator or other members of the project can easily fill in additional details in the project document without having to manually retrieve and aggregate information from different input documents. In this manner, the process of generating a project document can be significantly facilitated, which can result in significant savings in time and resources for the project.

In one embodiment, given a set of input documents, the project document generation system 110 generates a project document based on predicted input document types and a predicted architecture pattern of the project document. The document type specifies a category of an input document based on the contents of the document. For example, the categories may specify an input document based on different aspects of the project, such as whether an input document is directed to describing a business strategy for a project, or whether an input document is a planning document. As another example, the categories may specify an input document based on different functionalities, such as whether an input document includes results on data assessments, suitability assessments, or privacy assessments for a financial institution.

The architecture pattern for a set of input documents specifies the structure and organization of the resulting project document. The project document generation system 110 may analyze different architectures patterns across project documents in the system, and identify a set of architecture patterns that are used within the organization. As another example, different teams of an organization may have different structures and organizations for project documents, and thus, the architecture pattern can be defined with respect to the teams of the organization. For example, for a financial institution, the architecture pattern may indicate whether the architecture pattern of a project document is one or more of "Application," "Infrastructure," "API," "Services," and "Security" depending on the teams of the institution.

In one embodiment, the project document generation system 110 trains a machine-learned document type model configured to receive a set of features of an input document, and generate a predicted input document type. In one instance, the set of features are a bag-of-words of the input document that characterize the input document with respect to the words it contains and their corresponding frequencies in the document. The project document generation system 110 also trains a machine-learned architecture pattern model configured to receive features for a set of input documents, and generate a predicted architecture pattern for a project document associated with the set of input documents.

Figure 2:
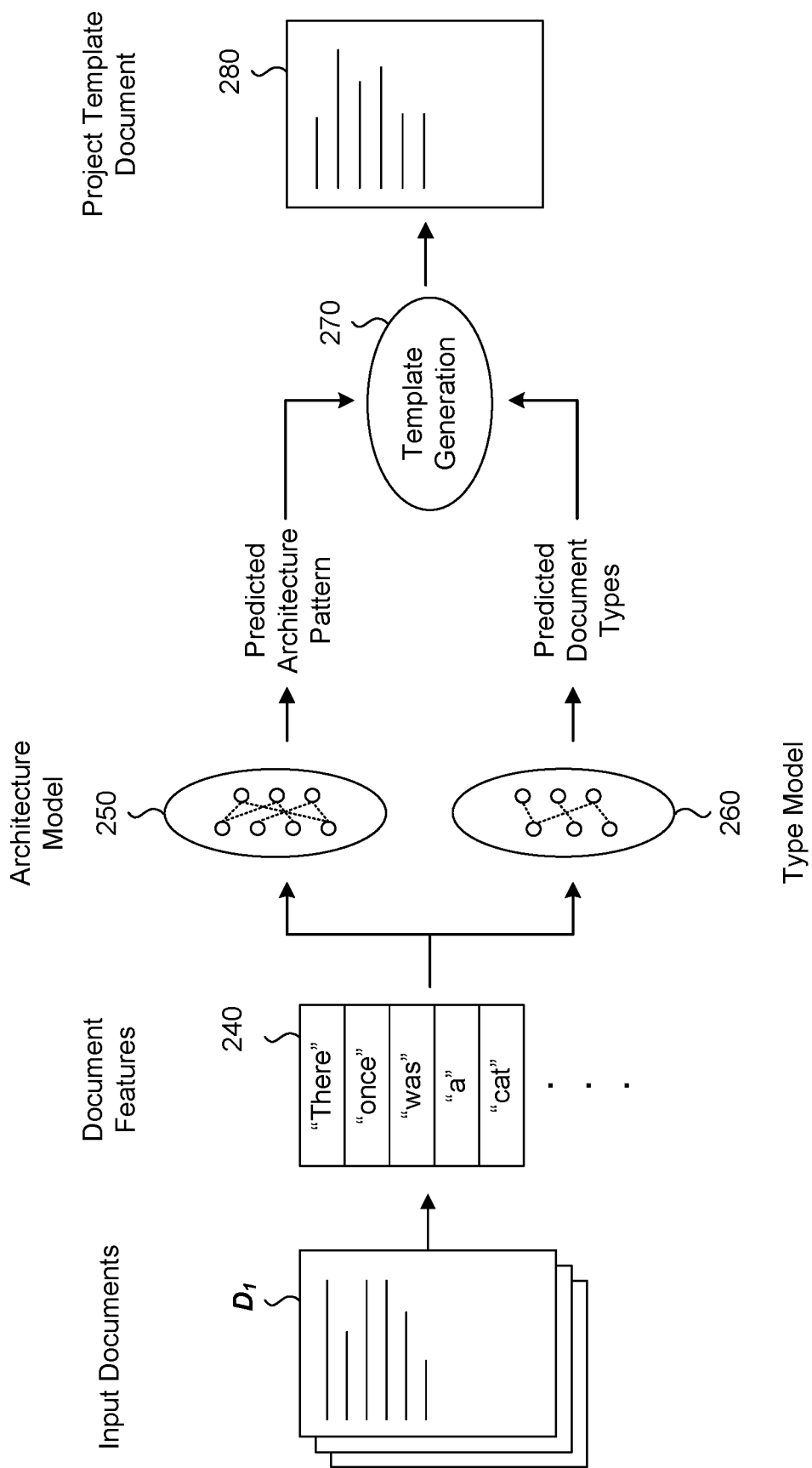
FIG. 2 illustrates an example inference process for generating a project document, according to one embodiment.

FIG. 2 illustrates an example inference process for generating a project document, according to one embodiment. During the inference process, the project document generation system 110 obtains a set of input documents $D_i$. The project document generation system 110 identifies features 240 for the set of input documents $D_i$. In the example shown in FIG. 2, the features 240 may be a bag-of-words for each input document. The project document generation system 110 applies a document type machine-learned model 260 to the features of each input document to generate predicted input document types. The project document generation system 110 applies an architecture pattern model 250 to features of the set of input documents to generate the predicted architecture pattern of the project document for the set of input documents. The predicted document types and the predicted architecture pattern are input to a template generation system 270 that outputs a project document 280 with the corresponding architecture pattern.

In one embodiment, the project document generation system 110 may identify and parse certain portions of input documents, and include these portions in the resulting project document. In this manner, the project document as a template may be automatically populated with key terms or key portions of input documents that are to be included in the project document, without having a human operator to manually replicate the content of the input documents themselves.

The project document generation system 100 is described in further detail in relation to FIG. 2. In some embodiments, there are multiple other systems or servers included in the computing environment. In other embodiments, the project document generation system 100 is composed of multiple systems such as individual servers and/or load balancers.

Returning to FIG. 1, the client device 110 is a computing device in communication with the project document generation system 100. The client device 110 is operated by a user or multiple users. The client device may be a computing device such as a smart phone, laptop computer, desktop computer, or any other device that can automatically generate project documents. In some embodiments, the computing environment has more than one client device that may be operated by multiple users. The user may send input documents to the project document generation system 100 via the client device 110. In some embodiments, the client device may include a web application for uploading input documents to the project document generation system 100.

The network 120 may be any suitable communications network for data transmission. In an embodiment such as that illustrated in FIG. 1, the network 120 uses standard communications technologies and/or protocols and can include the Internet. In another embodiment, the entities use custom and/or dedicated data communications technologies.

Project Document Generation System

Figure 3:
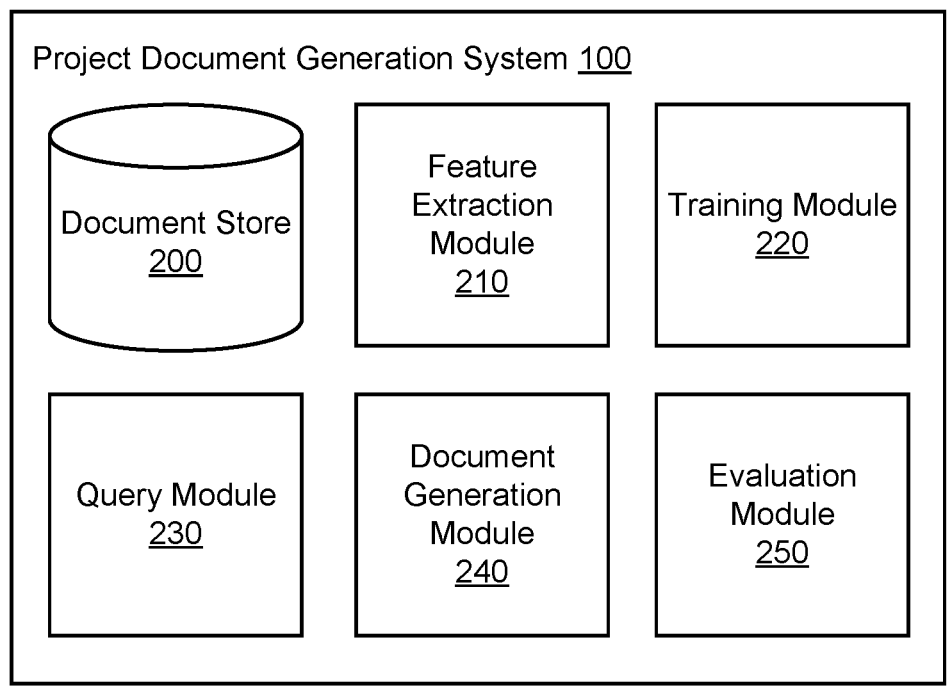
FIG. 3 shows components of the project document generation system, according to one embodiment.

FIG. 3 shows components of the project document generation system 100, according to one embodiment. The project document generation system 100 includes a document store 200, a word extraction module 210, a training module 220, a query module 230, a document generation module 240, and an evaluation module 250. The separate modules and configuration shown in FIG. 2 are for convenience in illustrating operation of the project document generation system 100 and may in practice include additional or fewer components that may be disposed at separate locations. For example, though shown here as a single document store 200 within the project document generation system 100, the document store 200 may be disposed across many individual data storage components that may be accessible via a network or data storage network and may include data duplication and redundancies and other features of the documents stored.

The document store 200 is a storage medium for storing the input documents received by the project document generation system 100 and project documents generated by the project document generation module 240. Input documents may be grouped according to their associated project, and may include documents with different file types, formats, and content. This information may not be specified by the document itself. Some examples of input documents include emails, electronic messages, business requirement documents, standards and patterns, vendor documents, or any other document related to a project. In some embodiments, the input documents are stored in the document store 200 as predetermined sets of input documents, grouped with other input documents that were entered by a user around the same time. In other embodiments, the input documents are stored in the document store 200 in relation to the project the input documents describe.

The input documents stored in the document store 200 may also be associated with known labels indicating the document type. The document type specifies a category of an input document based on the contents of the document. The types of document for input documents in the document store 200 may be determined by reviewing the contents of the input documents beforehand, and assigning the appropriate labels to the input documents based on the contents of the documents. These documents with known labels may be used in training the model that predicts document types.

Project documents are used to document a specific project in an integrated form, such as a business process, and may outline a process for completing the project. A project document may be associated with a group of input documents that were associated with the same project, and were used to generate the project document. Project documents and the group of input documents associated with the same project are stored in relation to a known architecture pattern. In particular, the architecture pattern of a project document specifies the structure and organization of the resulting project document.

The feature extraction module 210 extracts and stores a set of features from a document, including input documents stored in the document store 200. In some embodiments, the feature extraction module 210 uses a bag-of-words representation to process and retrieve information from the input documents. The bag-of-words representation is a compiled multiset of words from each document that tracks both words and frequency of occurrence of the words. The feature extraction model 210 extracts words from the input documents and records the frequency of occurrence of the words throughout the document to determine the top discriminant words from each input document, where discriminant words are separate and distinguishable from one another. The amount of top discriminant words may be those words having a frequency above a threshold percentage of the total words in a set or may be a particular number.

In one embodiment, when the file types of documents are in the form of images such as diagrams, graphs, and the like, the feature extraction module 210 extracts text from these images using a text recognition machine-learned model. The text recognition model is configured to receive an image, and output a bounding box around locations of the image that contain text. The feature extraction module 210 may provide the selected locations to a character recognition model, such as an optical character recognition (OCR) model, such that the text within the bounding box may be extracted. In this manner, the bag-of-words or other text-related features of the document may be extracted even though the document is in an image format. In one instance, the text recognition model is configured as a deep learning convolutional neural network (CNN) machine-learned model that includes a series of convolutional and pooling layers.

Figure 4:
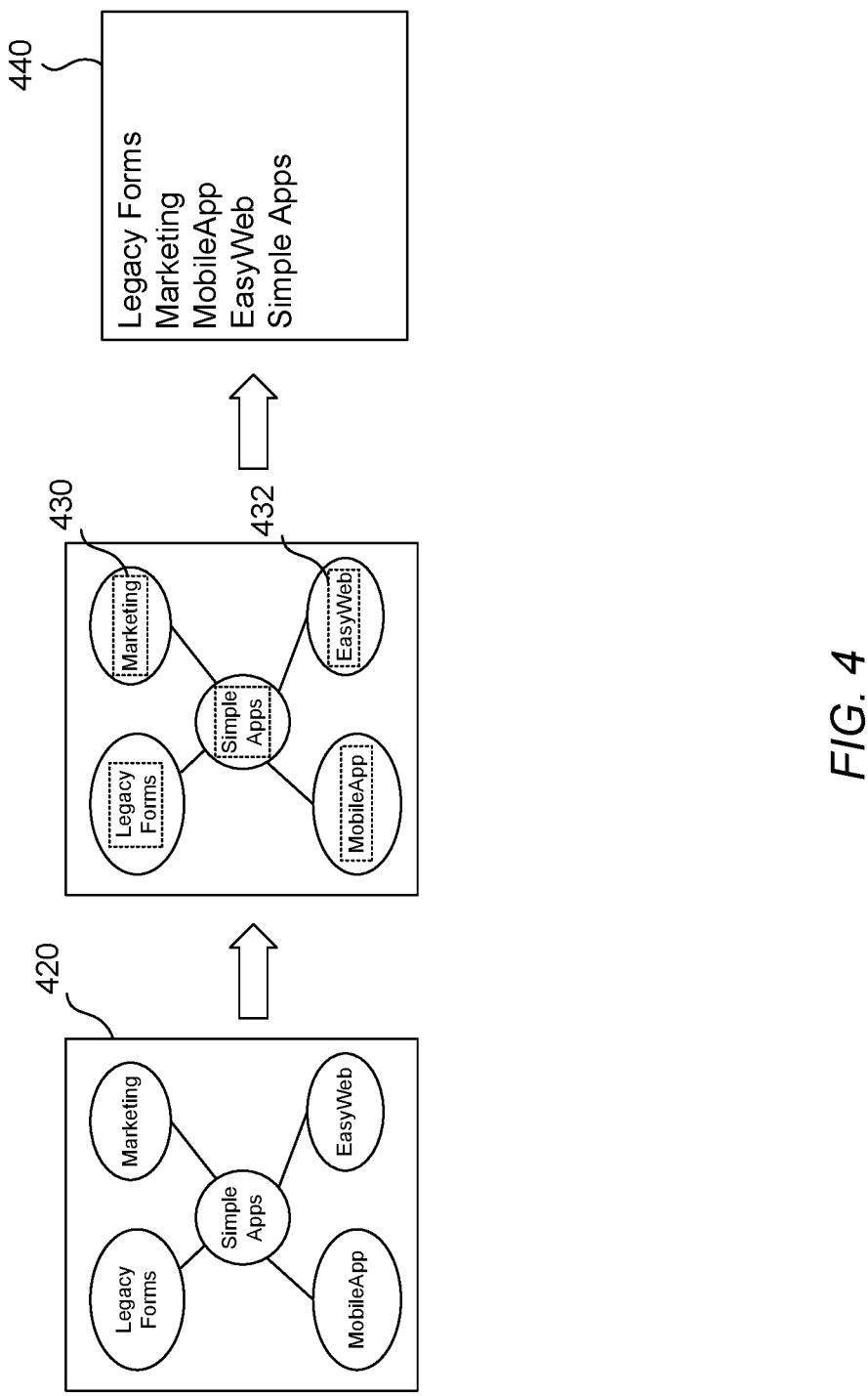
FIG. 4 illustrates an example text recognition process for detecting text in a document, according to one embodiment.

FIG. 4 illustrates an example text recognition process for detecting text in a document, according to one embodiment. As shown in FIG. 4, a document 420 that may be an input document for a project is obtained. The document may be in an image format, such that text contained in the document 420 is difficult to recognize with conventional methods. Among other things, the document 420 includes a graph diagram with multiple nodes, each containing text. The feature extraction module 210 applies the text recognition model to the image 420, and generates a set of estimated locations in the document that are detected to contain text. As shown in FIG. 4, various locations labeled with boxes including bounding boxes 430, 432 are identified to contain text. The feature extraction module 210 crops the selected locations of the image 420 and provides them to a recognition model. As shown in FIG. 4, the recognition model extracts the texts "Legacy Forms," "Marketing," "Mobile-App," "EasyWeb," and "Simple Apps" from the selected locations of the document 420, resulting in a list 440 of parsed words or phrases that were included in the document 420.

In one embodiment, the feature extraction module 210 trains the text recognition model by generating a set of synthetic training data. The synthetic training data is a computer-generated set of image documents, in which the locations of texts within each image are already known. The images in the synthetic training data may be generated to mimic images that are created within the organization. For a given set of training images, the feature extraction module 210 may train parameters of the text recognition model by repeatedly reducing a loss function that indicates a difference between an estimated set of locations and the known set of locations that contain text. The estimated set of locations is generated by applying the text recognition model with an estimated set of parameters to the training images.

In some embodiments, the feature extraction module 210 also extracts phrases, or sets of adjacent words, that are stored as tuples. The feature extraction module 210 may compare extracted phrases from a phrase store of common phrases from previously analyzed input documents, where common phrases are sets of adjacent words that have a high frequency of occurrence throughout the input documents. If the extracted phrase is not found in the phrase store or associated with a frequency over a threshold frequency, the feature extraction module 210 does not keep the extracted phrase with the set of words. If the extracted phrase is found in the phrase store and has a frequency of occurrence over the threshold frequency, the feature extraction module 210 keeps the extracted phrase with the set of words. In some embodiments, the feature extraction module 210 uses a document processor to pre-process the document text to expand acronyms, remove special characters from the extracted words, and correct misspellings with a fuzzy search. The document processor may also normalize the frequencies of the extracted words using term frequency-inverse document frequency to account for the frequencies of words within an entire corpus of input documents, like articles such as "the" or "a." The feature extraction module 210 stores sets of words and associated frequencies determined from each input document in relation to the input document. In some embodiments, the feature extraction module 210 is combined with the document store 200 to store the sets of words and input documents in arrays. In other embodiments, a set of words is stored with a pointer to, link to, or label for the related input document.

Returning to FIG. 3, the training module 220 trains the document type machine-learned model and the architecture pattern model. The document type model is configured to receive a set of features for an input document and generate the document type for the input document. In one embodiment, the document type model is configured as a random forest classifier that includes an ensemble of decision trees that can be trained for classification. The training module 220 trains the document type model using a training dataset that includes multiple instances of input documents and known document type data that are stored in association with the input documents in the document store 200. Each instance in the training dataset includes the set of features for an input document and the corresponding type of the input document. The set of features may be the bag-of-words or the discriminative bag-of-words of the input document.

For a given set of training data instances, the training module 220 trains the parameters of the document type model by repeatedly reducing a loss function indicating a difference between an estimated document type and the known document type. The estimated document type for a training instance is generated by applying an estimated set of parameters of the document type model to the set of features of the input document for the training instance. One or more error terms are backpropagated from the loss function to repeatedly update parameters of the model until a threshold criteria for the loss function has been reached.

The architecture pattern model is configured to receive a concatenated set of features for a group of input documents that are associated with a project, and generate one or more architecture patterns for the corresponding project document. Alternatively, the architecture pattern model may be configured to receive the concatenated set of features as well as the determined document types of the input documents that were output by the document type machine-learned model. The training module 220 trains the architecture pattern model using a training dataset that includes multiple instances of project documents and the known architecture pattern data of the project documents that are stored in the document store 200. Each instance in the training dataset includes a concatenated set of features of the group of input documents associated with the project, and the architecture pattern of the project document that was synthesized for the project.

For a given set of training data instances, the training module 220 trains the parameters of the architecture pattern model by repeatedly reducing a loss function indicating a difference between an estimated architecture pattern and the known architecture pattern. The estimated architecture pattern for a training instance is generated by applying an estimated set of parameters of the architecture pattern model to the concatenated set of features of the input documents that are associated with the project. One or more error terms are backpropagated from the loss function to repeatedly update parameters of the model until a threshold criteria for the loss function has been reached.

In one instance, the training module 220 trains the architecture pattern model using multiple classifiers, such as multiple random forest classifiers, in which each classifier is trained to recognize a particular architecture pattern. Specifically, each classifier may be configured to receive the concatenated set of features for a group of input documents that are associated with a project, and generate a score indicating a likelihood that the project document should be classified as the particular architecture pattern for the classifier. In such an instance, the known architecture pattern data for each training instance may be an indicator that represents whether the project document for the training instance was classified as the particular architecture pattern for the classifier. In such a manner, the resulting architecture pattern model is configured to output a multi-label estimation that includes likelihoods for each architecture pattern given a group of input documents.

The query module 230 receives queries from users and identifies documents in the document store 200 that are relevant to the search queries. For example, the query module 230 may retrieve documents that are directed to similar topics or concepts as the input query. Specifically, a query is a string of text provided by a user to identify documents in the document store 200 that represent topics of interest to the user.

In one embodiment, the query module 230 responds to queries by determining weight vectors for the documents in the document store 200 and the input query. The query module 230 retrieves documents associated with weight vectors below a threshold distance from the weight vector of the input query as the response to the query. The distance between two weight vectors may be determined by the cosine similarity between the two vectors. In one instance, the weight vector for a string of text is determined based on the term frequency (TF) and the inverse document frequency (IDF) of the document. The TF measures the number of times a term, such as a word or a phrase of words, occurs in a document. The IDF measures how much information a specific term provides, and in one instance, is determined by:

$$IDF(\text{Term}) = 1 + \log_e\left(\frac{\text{Total Number of Documents}}{\text{Number of Documents with Term}}\right).$$

Each element in a weight vector may be associated with a specific term in the vocabulary, and may be determined by multiplying the TF measure by the IDF for the term.

Figure 5:
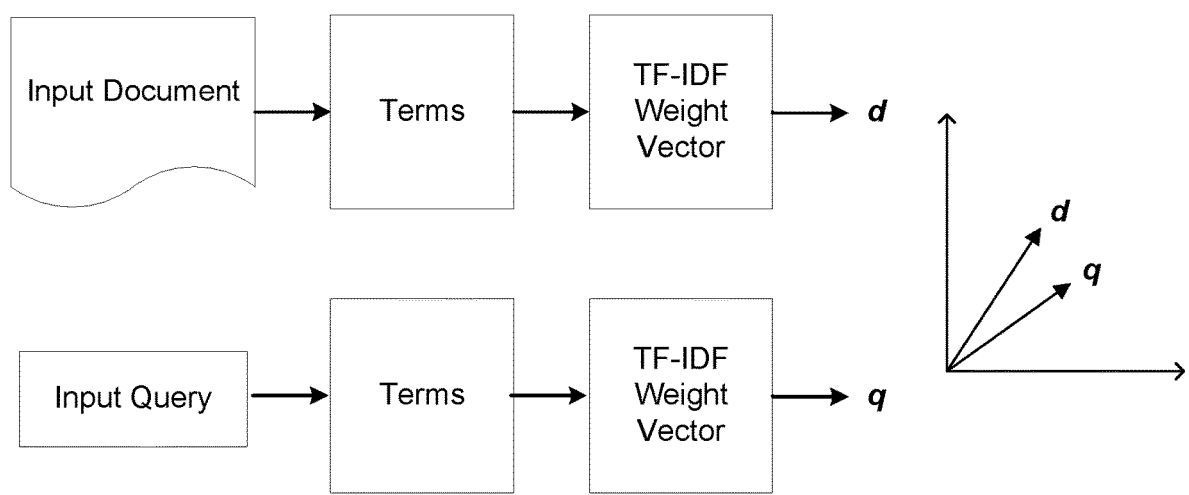
FIG. 5 illustrates an example process of responding to an input query, according to one embodiment.

FIG. 5 illustrates an example process of responding to an input query, according to one embodiment. As shown in FIG. 5, a set of terms are identified from an input document. The TF-IDF weight vector d is determined based on the identified terms of the document. This process may be repeated for multiple documents in the document store 200 to determine weight vectors for each document. Responsive to receiving an input query, the query module 230 identifies a set of terms in the input query, and determines the TF-IDF weight vector q for the input query. The query module 230 compares the weight vector q for the input query to weight vectors for documents in the document store 200, and identifies a subset of documents having below a threshold distance from the weight vector q of the input query. In the example shown in FIG. 5, the weight vector q is compared to weight vector d to determine whether the corresponding input document is relevant to the input query. However, in practice, the weight vector q is compared to weight vectors for many other documents in the document store 200.

In another embodiment, the query module 230 responds to queries by determining latent vectors for the documents in the document store 200 and the input query. The query module 230 retrieves documents associated with latent vectors below a threshold distance from the latent vector of the input query as the response to the query. The latent vector for a document represents a mapping of the document in a latent vector space. In one instance, the latent vector for a document is determined by constructing a document-term matrix (DTM), and decomposing the DTM matrix into one or more matrices to map the documents into latent vectors in a latent space. The columns of the DTM correspond to different documents, while the rows of the DTM correspond to different terms in the vocabulary. Thus, an element for a particular column and a particular row contains an indicator whether the document for that column contains the specific term for the row. In one instance, the latent vectors are identified through latent semantic analysis (LSA), in which the DTM is decomposed using singular value decomposition (SVD) to identify the latent vectors.

The document generation module 240 receives a set of input documents from a user, and generates a project document for the set of input documents. Though a user provides a set of input documents, the user may not specify what kind of project to generate. The document generation module 240 automatically generates the project document for the set of input documents by determining the document types of the input documents, and the architecture pattern of the project document. Specifically, using the feature extraction module 210, the document generation module 240 requests a set of features for each of the input documents. The document generation module 240 applies a trained document type model to the set of features for each input document to estimate the document type of the input document. The document generation module 240 also applies a trained architecture pattern model to the concatenated set of features to generate scores for each architecture pattern.

Based on these predicted characteristics, the document generation module 240 generates a project document for the project. In one instance, for a set of input documents, the document generation module 240 retrieves a template for the determined architecture pattern, and fills in the template using the top discriminant words from the sets of words of the input documents. In some embodiments, the document generation 240 module performs term frequency-inverse document frequency and cosine similarity between the top discriminant words of the sets of words of the input documents to determine the most relevant information for the project. The relevant information may be used to determine themes and theme distributions for the project document. Use of term frequency-inverse document frequency and cosine similarity allows the project document generation system 100 to automatically map terms to topics and themes and determine distributions for the project document. The project document created from the template and sets of words outlines themes and other important information for a project such that, in some embodiments, members of an organization may use it as an outline or summary of the project. In some embodiments, the project document is sent to the document store 200 to be stored before being sent back to the client device 110 via the network 120.

In one embodiment, when the architecture pattern model outputs multi-label estimations, the document generation system 240 may generate one candidate project document for one or more architecture patterns or a combination of one or more architecture patterns with a score above a threshold value. The document generation module 240 compares each candidate project document with the set of received input documents, and may rank the candidate project documents based on their comparison with the set of input documents.

The evaluation module 250 evaluates the accuracy of project documents generated by the document generation module 240. The evaluation module 250 is not used in every embodiment, and, instead, the project document may be sent back to the client device 110 to be manually reviewed by a user or users. In one embodiment, the evaluation module 250 generates an evaluation for a project document by comparing the project document to previously generated project documents stored in conjunction with the document store 200. The previously generated documents may be of the same architecture pattern or may be determined using a similarity metric. In one instance, the evaluation module 250 requests the query module 230 to determine a weight vector or latent vector for the previously generated project documents, and also for the project document for evaluation. The similarity metric between the project document and the previously generated project documents is determined from the distance of the vector for the project document and the vectors for previously generated project documents. In some embodiments, if the project document is below a threshold level of similarity, the evaluation module 250 performs more analysis on the project document or edits the project document using natural language generation. In other embodiments, the evaluation module 250 sends a notification to the client device 110 alerting the user that human review may be necessary. By evaluating the project document automatically, the evaluation module 250 reduces the time necessary for determining the validity of a project document.

Figure 6:
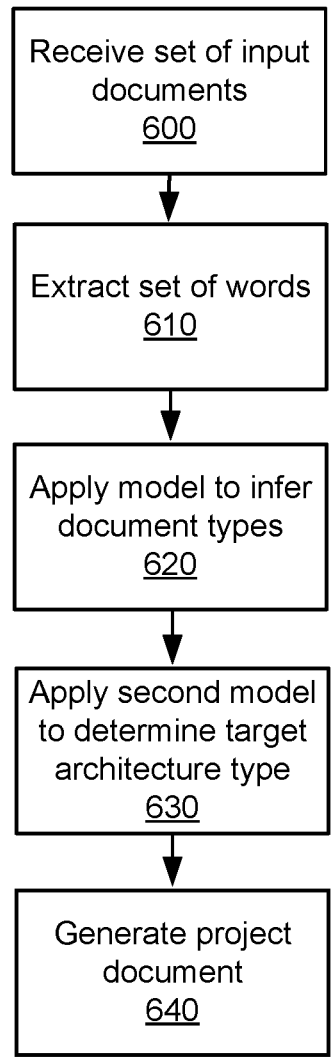
FIG. 6 is a flowchart illustrating a project document generation process, according to one embodiment.

FIG. 6 is a flowchart illustrating a project document generation process, according to one embodiment. The project document generation system 100 receives 600 a set of input documents from the client device 110. The input documents describe a particular project and may be a heterogeneous set of documents. The input documents are stored in the document store 200. The project document generation system 100 extracts 610 a set of features from each input document in the set of input documents via the feature extraction module 210. The feature extraction module 210 determines a frequency of occurrence for each word in each set of words and stores frequencies in relation to the words. In some embodiments, words in the set of words are characterized as features according to a subset of words with the highest frequency of occurrence within each input document in the set of input documents. In another embodiment, a subset of input words used may be based on the words that were discriminatory for identifying particular document types. These words may be identified after training document models, such that a document type model may use a full set of words, and the input vectors are reduced to a selected subset of discriminatory words as determined by the model.

The project document generation system 100 applies 620 a document type machine-learned model to the set of features associated with each input document to infer a document type of each input document. The document type machine-learned model may be configured as a random forest classifier that receives a bag-of-words representation as input. The project document generation system 100 applies 630 an architecture pattern machine-learned model using the inferred document type and the set of input documents to determine a target architecture pattern for the set of words. The project machine-learned model may also be configured as a random forest that receives a bag-of-words representation as input, but may also employ a plurality of random forests, such that the project machine-learned model employs one random forest for each known architecture type. The project document generation system 100 generates 640 a project document based on the target architecture pattern and the inferred document types via the document generation module 240. The architecture generation module 240 may fill in a template associated with the architecture type using words with the highest frequencies from the sets of words of the input documents.

It is appreciated that although FIG. 6 illustrates a number of interactions according to one embodiment, the precise interactions and/or order of interactions may vary in different embodiments. For example, in some embodiments, the project document generation system 100 further evaluates the project document using the evaluation module 250 to determine an estimate of the accuracy of the project document. The evaluation module 250 may use cosine similarity and term frequency-inverse document frequency to evaluate the project document.

Figure 7:
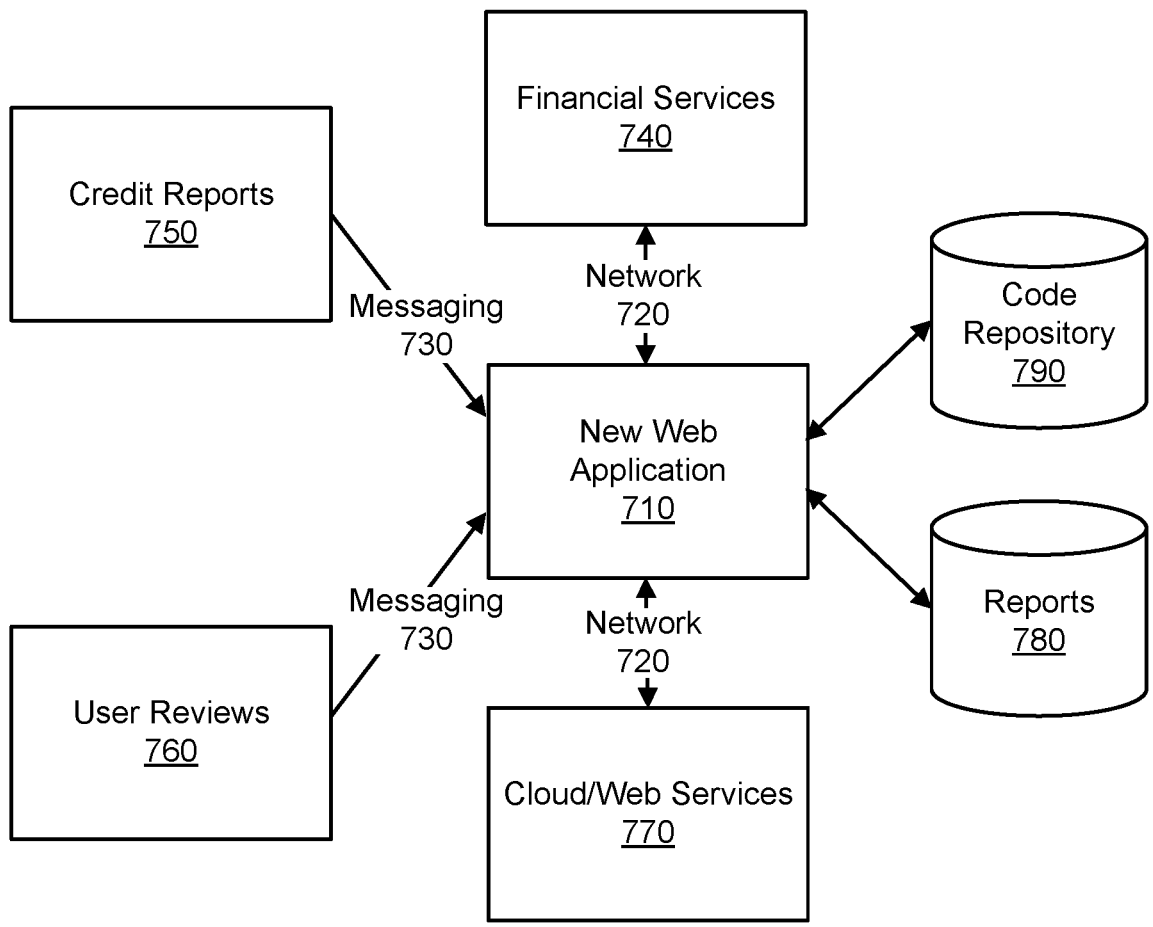
FIG. 7 is an example project document, according to one embodiment.

FIG. 7 is an example project document 700, according to one embodiment. In this example, the project document shows the components needed to create and support a new web application 710. The various components are connected to the web application through networks 720 or messaging 730. The components needed for the new web application 710 include financial services 740, credit reports 750, user reviews 760, cloud/web services 770, reports 780, and a code repository 790. The project document summarizes what is necessary to create this new web application, such as financial support and reports and outlines what a company who wants to make this new web application would need to focus on in order to create the new application.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer system comprising:
a computer processor; and
a non-transitory computer-readable storage medium storage having instructions that when executed by the computer processor perform actions comprising:
receiving a set of two or more input documents, the set of input documents describing a project;
extracting a set of features associated with each input document;
applying, for each input document, a document type machine-learned model to the set of features associated with the input document to infer a document type of the input document;
applying an architecture pattern machine-learned model to a concatenated set of features for the set of input documents to determine a target architecture pattern for a project document associated with the project, wherein the target architecture pattern specifies a structure and organization of a project document including information from each of the set of input documents; and
generating the project document for the project based on the document types for the set of input documents and the target architecture pattern determined for the set of input documents.

2. The computer system of claim 1, the actions further comprising:
evaluating the project document against previous project documents or input documents from the set of input documents using cosine similarity and term frequency-inverse document frequency.

3. The computer system of claim 1, wherein the document type machine-learned model and the architecture pattern machine-learned model include random forest classifiers.

4. The computer system of claim 1, wherein the architecture pattern machine-learned model includes a plurality of random forest classifiers.

5. The computer system of claim 1, wherein the document type machine-learned model and the architecture pattern machine-learned model are configured to receive a bag-of-words representation as the set of features for the input document.

6. The computer system of claim 1, wherein the set of features for each input document are a subset of words based on frequency of occurrence within the input document.

7. The computer system of claim 1, wherein each document type specifies a functionality of an input document based on contents of the input document, wherein functionalities include one or more of data assessments, suitability assessments, or privacy assessments.

8. The computer system of claim 1, the actions further comprising automatically populating the project document with key terms from each of the set of input documents.

9. The computer system of claim 1, wherein the project document displays components needed to create and support a new web application.

10. A non-transitory computer-readable storage medium comprising instructions executable by a processor, the instructions comprising steps for the processor to:
receive a set of two or more input documents, the set of input documents describing a project;
extract a set of features associated with each input document;
apply, for each input document, a document type machine-learned model to the set of features associated with the input document to infer a document type of the input document;
apply an architecture pattern machine-learned model to a concatenated set of features for the set of input documents to determine a target architecture pattern for a project document associated with the project, wherein the target architecture pattern specifies a structure and organization of a project document including information from each of the set of input documents; and
generate the project document for the project based on the document types for the set of input documents and the target architecture pattern determined for the set of input documents.

11. The non-transitory computer-readable storage medium of claim 10, the instructions further comprising:
evaluating the project document against previous project documents or input documents from the set of input documents using cosine similarity and term frequency-inverse document frequency.

12. The non-transitory computer-readable storage medium of claim 10, wherein the document machine-learned model and the architecture pattern machine-learned model include random forest classifiers.

13. The non-transitory computer-readable storage medium of claim 10, wherein the architecture pattern machine-learned model includes a plurality of random forest classifiers.

14. The non-transitory computer-readable storage medium of claim 10, wherein the document type machine-learned model and the architecture pattern machine-learned model are configured to receive a bag-of-words representation as the set of features for the input documents.

15. The non-transitory computer-readable storage medium of claim 10, wherein the set of features for each input document are a subset of words based on frequency of occurrence within the input document.

16. A computer-implemented method for automated document generation, the method comprising:
receiving a set of two or more input documents, the set of input documents describing a project;
extracting a set of features associated with each input document;
applying, for each input document, a document type machine-learned model to the set of features associated with the input document to infer a document type of the input document;
applying an architecture pattern machine-learned model to a concatenated set of features for the set of input documents to determine a target architecture pattern for a project document associated with the project, wherein the target architecture pattern specifies a structure and organization of a project document including information from each of the set of input documents; and
generating the project document for the project based on the document types for the set of input documents and the target architecture pattern determined for the set of input documents.

17. The computer-implemented method of claim 16, further comprising:
evaluating the project document against previous project documents or input documents from the set of input documents using cosine similarity and term frequency-inverse document frequency.

18. The computer-implemented method of claim 16, wherein the document type machine-learned model and the architecture pattern machine-learned model are random forest classifiers.

19. The computer-implemented method of claim 16, wherein the architecture pattern machine-learned model is a plurality of random forest classifiers.

20. The computer-implemented method of claim 16, wherein the document type machine-learned model and the architecture pattern machine-learned model are configured to receive a bag-of-words representation as the set of features for the input documents.

21. The computer-implemented method of claim 16, wherein the set of features for each input document are a subset of words based on frequency of occurrence within the input document.

* * * * *